Figures 1, 2:
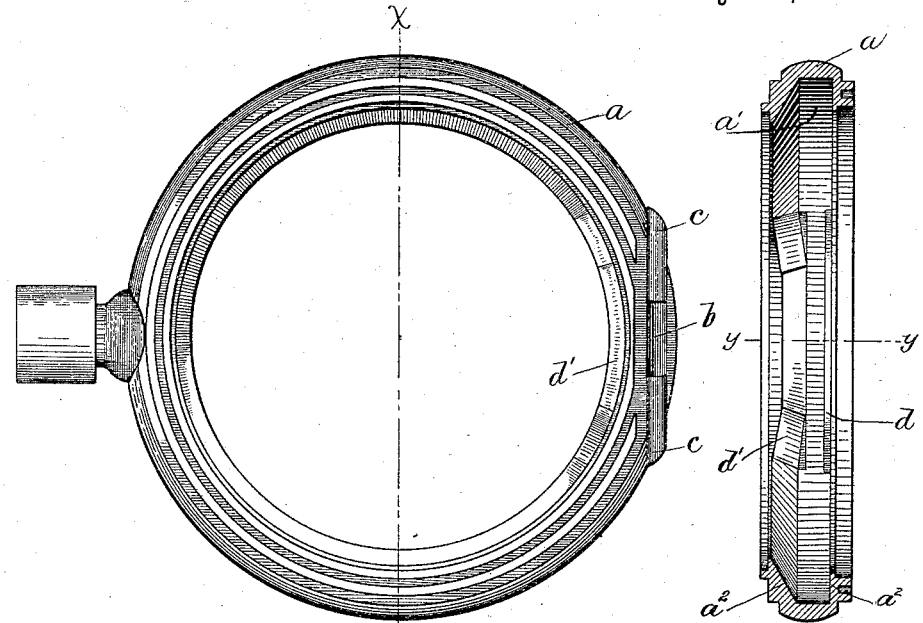

(No Model.)

D. O'HARA.
MANUFACTURE OF WATCH CASE CENTERS.

No. 432,761. Patented July 22, 1890.

WITNESSES:
A. D. Harrison
W. C. Ramsay.

INVENTOR:
D. O'Hara
Wright Brown Crosby
Attys.

UNITED STATES PATENT OFFICE.

DANIEL O'HARA, OF WALTHAM, MASSACHUSETTS, ASSIGNOR TO THE AMERICAN WALTHAM WATCH COMPANY, OF SAME PLACE.

MANUFACTURE OF WATCH-CASE CENTERS.

SPECIFICATION forming part of Letters Patent No. 432,761, dated July 22, 1890.

Application filed November 2, 1889. Serial No. 329,036. (No model.)

*To all whom it may concern:*

Be it known that I, DANIEL O'HARA, of Waltham, in the county of Middlesex and State of Massachusetts, have invented certain new and useful Improvements in the Method of Making Watch-Case Centers, of which the following is a specification.

This invention relates to the portion of a watch-case center which supports the hinges of the back and inner cap, and in hunting-cases the hinge of the front cap or lid, and in open-face cases of the hinge of the bezel. A case-center as usually constructed is composed of two inwardly-projecting flanges, on the outer surfaces of which are the seats for the back, inner cap, bezel, &c., and a marginal portion connecting said flanges, the flanges being separated by a deep groove formed in the case-center. In the completed center it is desirable for the sake of lightness and economy of metal that said flanges be comparatively thin, as they are not subjected to any considerable pressure after completion and in the ordinary use of the watch. It has been customary heretofore to cut the said groove to its full width all around the case-center, and thereby reduce the flanges to their final form before the stamping, hammering, and other operations, which form the seats and shoulders on the exterior of said flanges, and fit the back and other movable parts of the case thereto, are performed. The flanges thus reduced, while thick enough for all requirements of the finished case-center, have not sufficient thickness and stiffness to enable them to resist the pressure incidental to the said stamping and hammering operations; hence during said operations the flanges are liable to be pressed inwardly to such an extent as to distort the case-center and destroy the uniformity of width of the groove therein. Said groove, when made entirely around the case-center of the width desirable at the spring-receiving portions of the center, is so wide that when the exterior of the case-center is cut away to form seats or sockets for the hinges the depressions thus formed extend through the portions of the case-center forming the sides of the groove. It is necessary therefore to re-enforce or thicken the case-center at the points where the hinge-seats are formed. Heretofore this re-enforcement has been effected by soldering pieces of metal, called "stays," upon the sides of the groove, said stays being located so that portions of the hinge seats or sockets are formed in them.

My invention has for its object, first, to prevent the necessity of cutting away the flanges to the full extent required in the completed case-center before the latter is finished, and, secondly, to do away with the application of independent pieces or stays to the case-centers, and thus avoid the objectionable use of solder and the expense for labor incidental to the employment of soldered pieces or stays; and to this end it consists in leaving the flanges all around the center of the same thickness that they are at the re-enforced portions in the completed center until after the completion of the outer surfaces of the center, and subsequently removing parts of said flanges and leaving portions to constitute the re-enforced or thickened parts, the latter being integral with the body of the case-center instead of in separate pieces, as heretofore.

Figure 3:
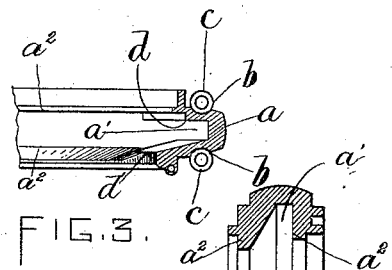
Figure 4:
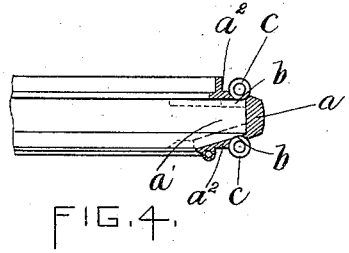
Figure 5:
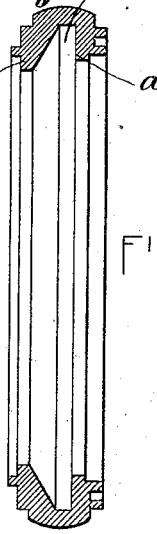

In the accompanying drawings, forming a part of this specification, Figure 1 represents a side view of a completed case-center having my improvements. Fig. 2 represents a section on line *x x*, Fig. 1, looking toward the right. Fig. 3 represents a section on line *y y*, Figs. 1 and 2. Fig. 4 represents a section showing the case-center with the groove as formerly made, and representing the soldered stays by dotted lines. Fig. 5 represents a sectional view of the case-center in the condition in which it is left while the external finishing operations are being performed.

The same letters of reference indicate the same parts in all the figures.

In the drawings, *a* represents a case-center, in which is formed the spring-receiving groove *a'* between the side flanges $a^2$ $a^2$.

*b b* represent the seats or sockets, which are formed in the exterior of the case-center in the usual way, for the reception of the hinge members *c c*, which are affixed to the case-center, and the corresponding hinge members, (not shown), which are affixed to the back and cover. It will be understood that there is nothing new in the hinges nor in the manner of applying them, the construction being as usual in this particular. In the completed center the width of the groove $a'$ is such that the hinge seats or sockets would cut through into the groove $a'$, as indicated in Fig. 4, if the case-center were not re-enforced at this point.

As already indicated, the case-center has usually been re-enforced heretofore by independent pieces soldered to the sides of the grooves, said pieces being indicated by dotted lines in Fig. 4.

In carrying out my invention I leave the groove $a'$ all around the case-center of the same width that it is at the re-enforced portions, hereinafter described, in a finished center; or, in other words, I leave the flanges $a^2$ $a^2$ as thick all around the case-center as they are at the said re-enforced portions until after the stamping, hammering, and other operations which are required to finish the outer surfaces of said flanges are performed, so that the flanges during this stage have sufficient strength and stiffness to enable them to resist the pressure incidental to said operations. Fig. 5 shows the case-center in the condition above described. After the said external forming operations have been performed I mill away the inner surfaces of the flanges at all points excepting where extra thickness is required, the milling operation being performed in such manner as to leave re-enforcements or stays $d\ d'$, which are integral with the body of the case-center and occupy the positions of the soldered stays heretofore used. By this method I prevent distortion and inward bending of the flanges $a^2$ and insure the absolute uniformity of the groove, so that different styles of springs can be used interchangeably with all centers made in the manner described. I also avoid the use of solder so far as the stays are concerned, and thus obviate the solder-joints, which extend along hinge-sockets cut into soldered stays. In some cases the center will be provided with only one stay or re-enforcement instead of two, or more than two stays may be formed, my invention not being limited to any particular number of stays.

The absolute uniformity of the groove secured by my improvement is a very important advantage. The centers are put through the different processes of annealing, stamping, and hammering, while the additional thickness of the stays is on the flanges, making them unyielding. The centers are then turned out, leaving the stays as described, after all the fitting and pressing has been done and just before the springing and finishing jobs take place. I am thus enabled to make the groove of exactly the same width as all other grooves made by this method, so that the grooves can receive interchangeable springs just as they come from the die without further labor. As the flanges of the center are too thick to sink under the pressure of the exterior finishing operations, a uniform rest for the movement seat is insured and an interchangeable line for the winding-arbor through the pendant.

I am aware that case-centers have been pressed or rolled so as to form a stay on the center; but in so doing the outside of the center has been pressed inwardly, thus defacing its exterior. The stock displaced in this way is insufficient to form a stay as large as necessary or give it proper mechanical proportions. Such cases are limited as to size of hinge and openings therefor.

I claim—

The improved method herein described of making watch-case centers, the same consisting in making the center with flanges of greater thickness than that of the flanges in the completed center, then finishing the external surfaces of said flanges by the usual operations, and after said finishing operations removing portions of the inner surfaces of said flanges to give the groove the desired width and leaving other portions to form stays which are integral with the case-center, as set forth.

In testimony whereof I have signed my name to this specification, in the presence of two subscribing witnesses, this 10th day of October, A. D. 1889.

DANIEL O'HARA.

Witnesses:
C. F. BROWN,
A. D. HARRISON.